United States Patent [19]

Lee

[11] Patent Number: 5,712,741

[45] Date of Patent: Jan. 27, 1998

[54] SYNCHRONIZING SIGNAL DETECTING APPARATUS FOR DIGITAL VIDEO CASSETTE RECORDER

[75] Inventor: Doo Hee Lee, Seoul, Rep. of Korea

[73] Assignee: LG Electronics Inc., Seoul, Rep. of Korea

[21] Appl. No.: 544,869

[22] Filed: Oct. 18, 1995

[30] Foreign Application Priority Data

Oct. 19, 1994 [KR] Rep. of Korea ............................ 26731

[51] Int. Cl.$^6$ .............................. G11B 5/09; H04N 9/80; H04N 5/932
[52] U.S. Cl. .................................. 360/51; 386/12; 386/84
[58] Field of Search ................................ 360/51; 386/12, 386/71, 84

[56] References Cited

U.S. PATENT DOCUMENTS

| 4,275,466 | 6/1981 | Yamamoto | 360/51 |
| 4,769,704 | 9/1988 | Hirai et al. | 386/12 |
| 4,943,865 | 7/1990 | Hales et al. | 360/64 |
| 5,396,377 | 3/1995 | Yang | 360/51 |
| 5,446,715 | 8/1995 | Satamura | 369/49 |

Primary Examiner—Aristotelis M. Psitos
Assistant Examiner—Regina Y. Neal
Attorney, Agent, or Firm—John P. White

[57] ABSTRACT

A synchronizing signal detecting apparatus for a digital video cassette recorder (DVCR), which can detect a more stable synchronizing signal by detecting the synchronizing signal in a parallel processing method includes input signal convertor for converting input serial data, a first head switching pulse and a first clock into parallel data, a second head switching pulse and a second clock, a vertical synchronizing signal detector and a block synchronizing signal detector for respectively detecting a vertical synchronizing signal and a block synchronizing signal from the parallel data, second head switching pulse and second clock output from the input signal converter, and a data former for outputting finally output data in accordance with synchronizing patterns using the parallel and second clock. This apparatus allows a synchronizing signal to be detected more precisely. Also, the acquisition of slipped data is facilitated by rearranging output data in the unit of sync blocks.

5 Claims, 10 Drawing Sheets

SYNCHRONIZING SIGNAL DETECTING APPARATUS FOR DIGITAL VIDEO CASSETTE RECORDER

BACKGROUND OF THE INVENTION

The present invention relates to a synchronizing signal detecting apparatus for a digital video cassette recorder (DVCR), and more particularly, to a synchronizing signal detecting apparatus for a DVCR, which can detect a more stable synchronizing signal by detecting the synchronizing signal in a parallel processing method.

In general, a synchronizing signal detection adopts a serial processing method. A synchronizing signal detecting apparatus adopting such a serial processing method is disclosed in U.S. Pat. No. 4,275,466 and is shown in FIG. 1, in which data signals SD from an input port 11 are applied to a synchronizing signal matching portion 15 through a shift register 14. Synchronizing signal matching portion 15 having a synchronizing pattern outputs a synchronizing signal SI detected when a synchronizing signal among input data signals SD is the same with the synchronizing pattern.

A signal PG from an input port 13 is produced from a head and notifies that a track starts to be read. An input signal PR is a reference signal of this system. A signal SM is a search mode setting signal. If the signal PG is applied, the signal SM becomes 'high.' Then, if there is a signal SI incoming for the first time following after the signal PG, the signal SM becomes 'low.' The detected signal SI is regarded as the originally detected synchronizing signal via a D-flipflop 20.

Also, a counter 22 repeatedly counts outputs of an OR gate 18 from 0 to N−1. The counted synchronizing signal is searched in an AND gate 23. In other words, counter 22 counts the output of OR gate 18 to generate a synchronizing signal.

A comparator 35 compares the detected synchronizing signal SI with the synchronizing signal output from counter 22 to output a final synchronizing signal (SYNC). In FIG. 1, a signal SC is an output signal of comparator 35. A signal CM is a check mode signal. The signal CM becomes 'high' when the detected synchronizing signal SI is not detected at a position where the signal should be detected. If the signal SC is generated, the signal CM becomes 'low.'

FIG. 2 is a timing chart for comparison of the synchronization pattern and outputs of synchronizing signals during a normal operation.

FIGS. 3 and 4 are timing chart showing the relationship among the respective signals when the detected synchronizing signal SI is erroneously detected. In FIG. 3, a portion "a" is a place where the detected synchronizing signal SI should float. However, since the detected synchronizing signal SI is not floated, a synchronizing signal counted at a position N−1 is inserted to output a final synchronization signal (SYNC) like a portion "b."

If the detected synchronizing signal SI is the same as the counted synchronizing signal SI, the signal CM is not generated but is regarded as the synchronizing signal (SYNC) as it is.

FIG. 4 shows that the signal is detected in the state where the detected synchronizing signal SI is shifted, in which the detected synchronizing signal SI should float at a portion "a." However, the detected synchronizing signal SI does not actually float thereat. Thus, the synchronizing signal (SYNC) is floated as the counted synchronizing signal (portion "b").

Both the counted synchronizing signal and the detected synchronizing signal SI are regarded as the final synchronization signal (SYNC). Also, the signal generated thereafter are normally detected whatever it is a detected or counted signal. FIG. 4 shows that a synchronizing signal generation principle, that is, synchronizing signals are generated in a constant interval, is not satisfied.

A synchronizing pattern, a predefined bit stream of a constant interval for serial data, is an important factor in detecting a synchronizing signal. The degradation of the synchronizing pattern due to a tape damage, signal deterioration or drum rotation speed error makes it cause difficult to detect synchronizing signal. This may lead to errors in the synchronizing pattern.

Also, Errors generated in a data pattern may be erroneously detected as the errors for the synchronizing pattern. The clock numbers between the respective synchronizing patterns may be different from each other. The aforementioned serial processing method has a problem of a synchronizing signal detection error.

SUMMARY OF THE INVENTION

To solve the above problems of the prior art, it is an object of the present invention to provide a synchronizing signal detecting apparatus for a digital video cassette recorder (DVCR) for detecting a stable synchronizing signal, wherein predefined synchronizing patterns are first regarded as being synchronous even if the predefined synchronizing patterns are not all matched but have an error of a few bits, a synchronizing signal is prevented from being erroneously detected from data by presetting a position where the synchronizing signal is to be generated, and a clock number difference between synchronizing patterns is removed by presetting a synchronizing signal matching position in a parallel processing method.

To accomplish the above object, there is provided a synchronizing signal detecting apparatus for a digital video cassette recorder (DVCR) comprising: input signal converting means for converting input serial data, a first head switching pulse and a first clock into parallel data, a second head switching pulse and a second clock; vertical synchronizing signal detecting means and block synchronizing signal detecting means for respectively detecting a vertical synchronizing signal and a block synchronizing signal from the parallel data, second head switching pulse and second clock output from the input signal converting means; and data forming means for outputting finally output data in accordance with synchronizing patterns using the parallel and second clock.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

First, a data type of data recorded onto a tape and a synchronizing block structure will be described.

Figure 1:
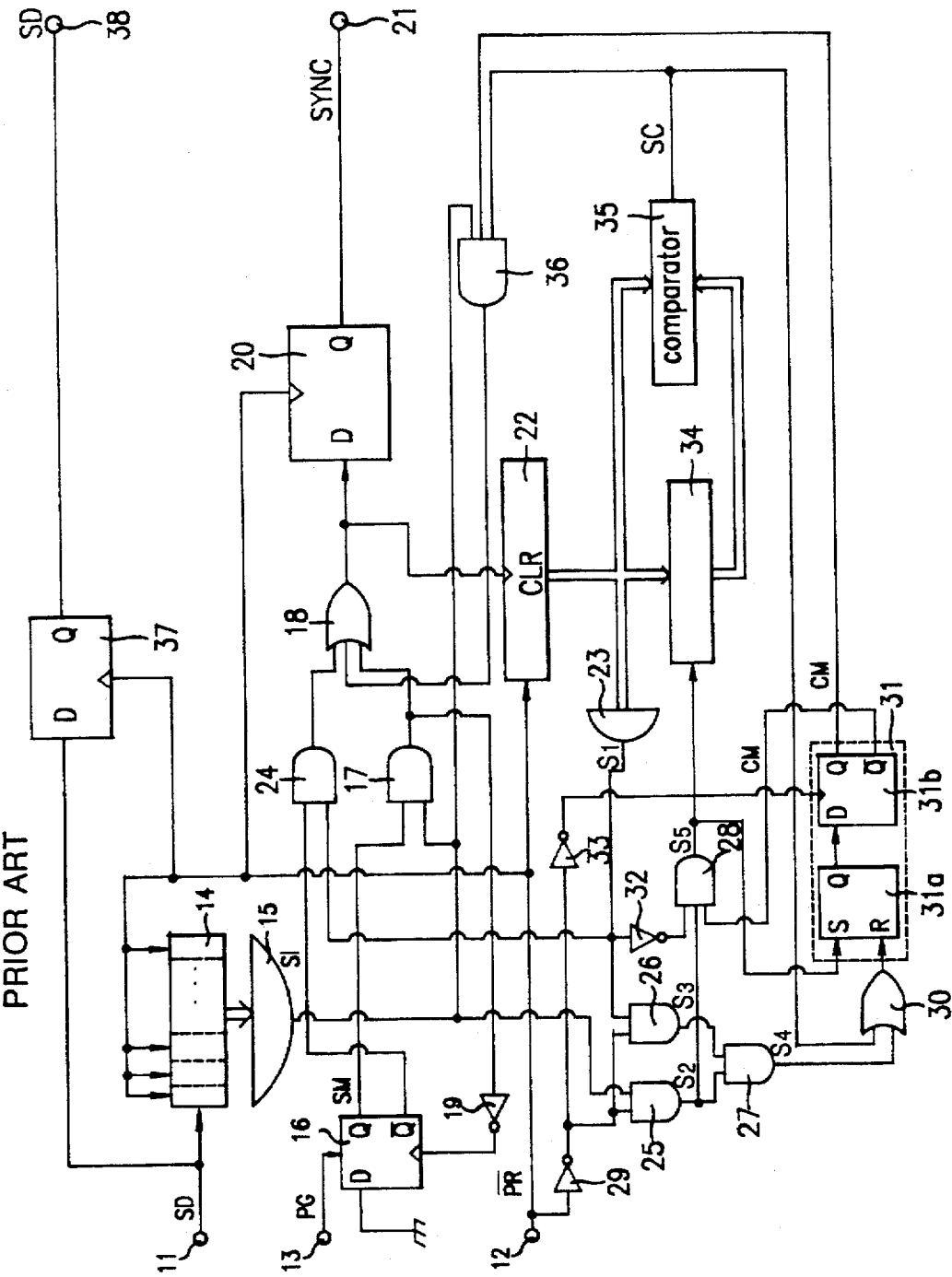
FIG. 1 is a schematic diagram of a conventional synchronizing signal detector.
Figure 2:
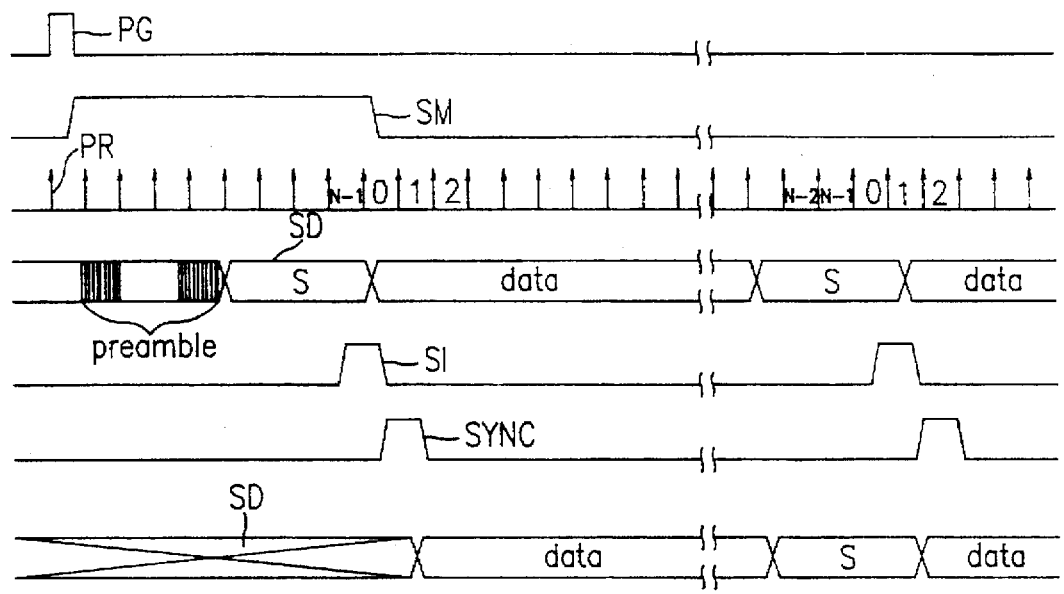
FIG. 2 shows timing charts of various signals shown in FIG. 1.
Figure 3:
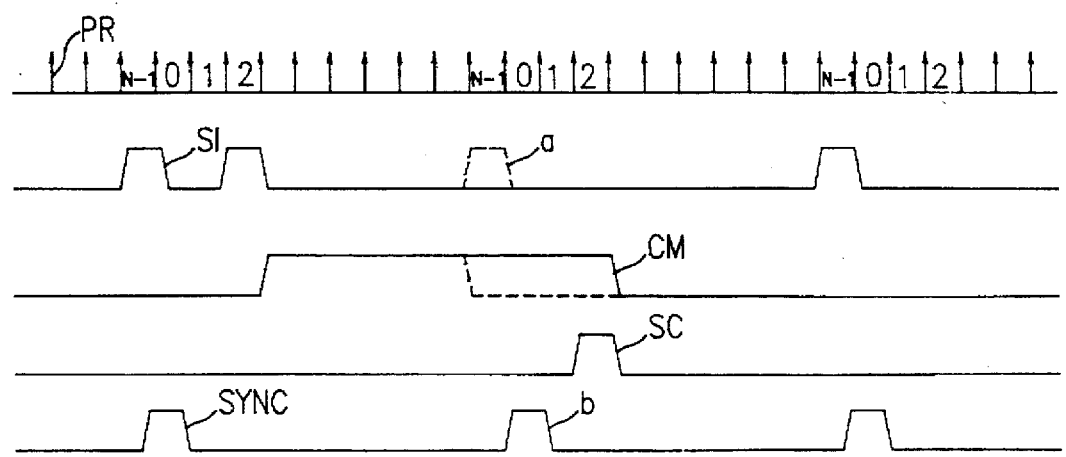
FIGS. 3 and 4 show timing charts of various signals in the case that the detected synchronizing signal of FIG. 1 is erroneously detected.
Figure 4:
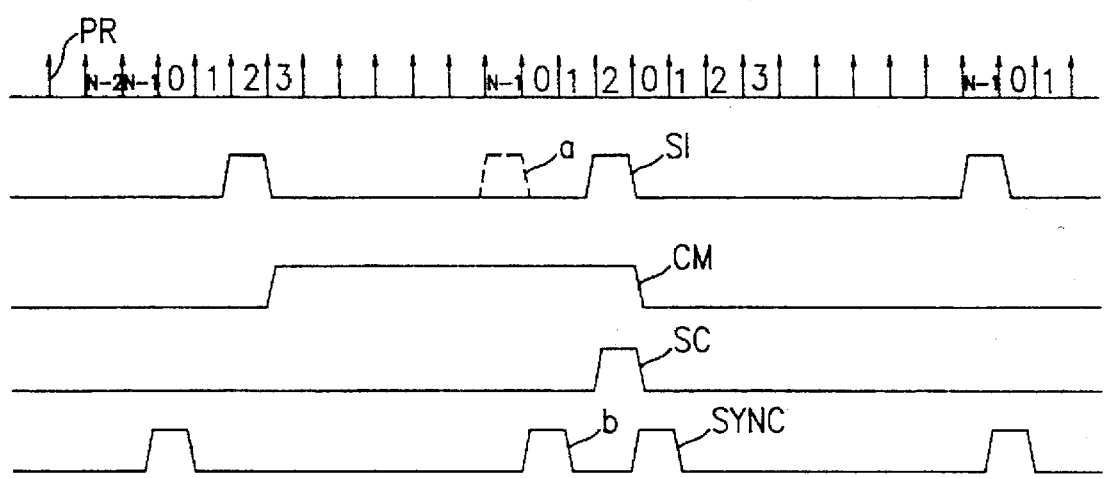
Figure 5:
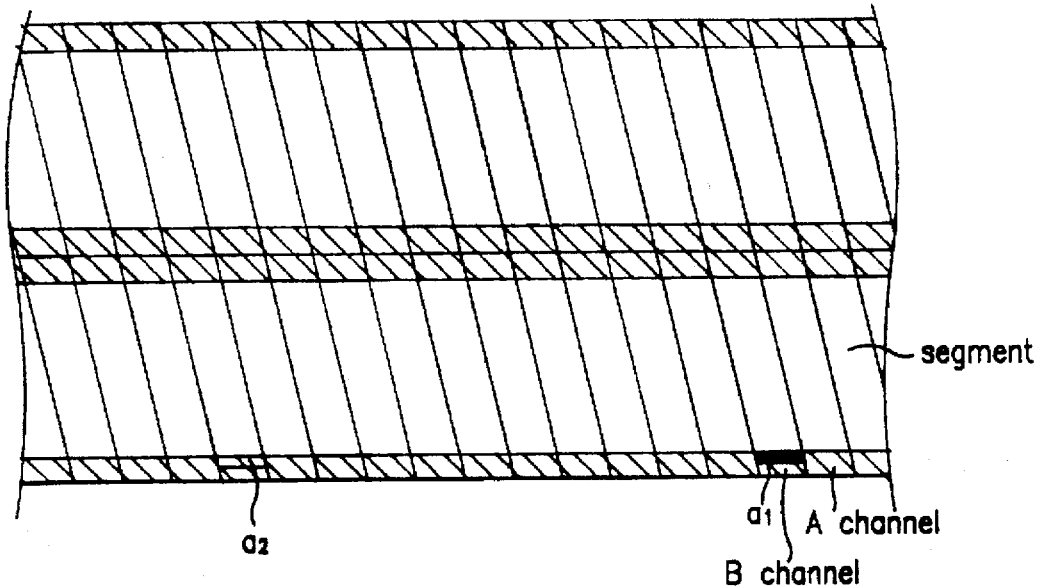
FIG. 5 shows how data are generally recorded onto a magnetic recording medium.

FIG. 5 shows a data type recorded onto a tape, in which a oblique portion contains dummy data which are not regarded as actual data.

Also, vertical synchronizing signal (Vsync) pattern of a 4-sync byte generated in the unit of 2 frames is recorded at portions a1 and a2. The Vsync pattern is recorded in the dummy data before the first block synchronizing signal for the respective four tracks of every channel.

Data are also loaded in the remaining portions and one segment corresponds to the interval between dummy data.

Figure 6:
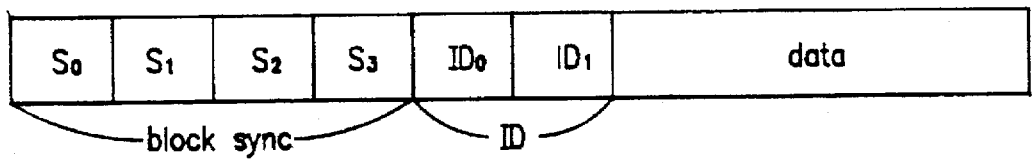
FIG. 6 shows the structure of a synchronous block within a segment.

FIG. 6 shows the structure of a synchronizing block recorded within one segment. A synchronizing block is composed of 4 sync bite block syncs and 2 sync bite identification (ID) and data. 1 sync bite corresponds to n bits. ID0 represents a segment number and ID1 represents a block number.

Figure 7:
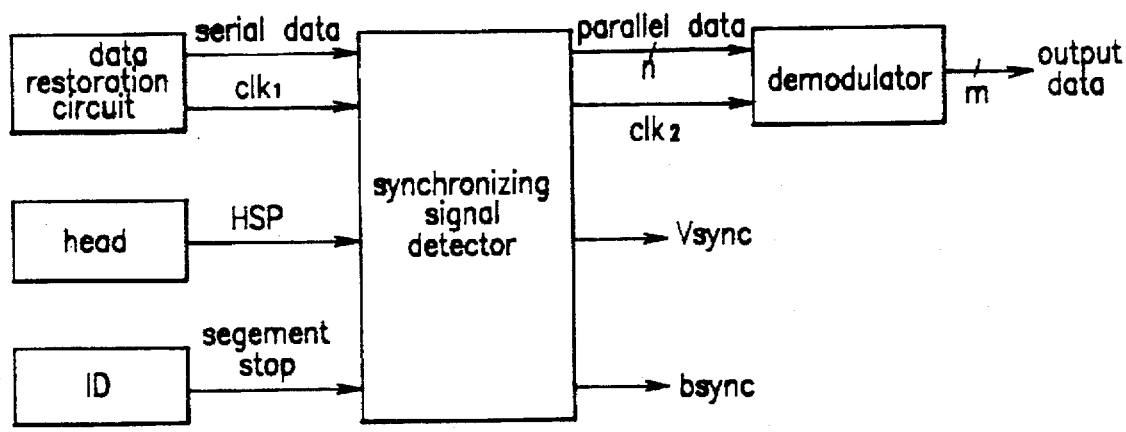
FIG. 7 is a schematic block diagram of the present invention.

FIG. 7 is a schematic block diagram of the present invention. Serial data read from a tape and a clock 1 (clk1) corresponding thereto are input to a synchronizing signal detector 100 according to the present invention. A head switching pulse (HSP) and a segment stop signal are input from a head and an ID as reference signals.

Synchronizing signal detector 100 detects a vertical synchronizing signal (Vsync) and and a block Synchronizing signal (bsync) using the above respective signals n-bit parallel data and a clock 2 (clk2) are transmitted to a demodulator. Demodulator outputs m-bit data. At this time, n is greater than m, in the parallel data and demodulator output data.

Figure 8:
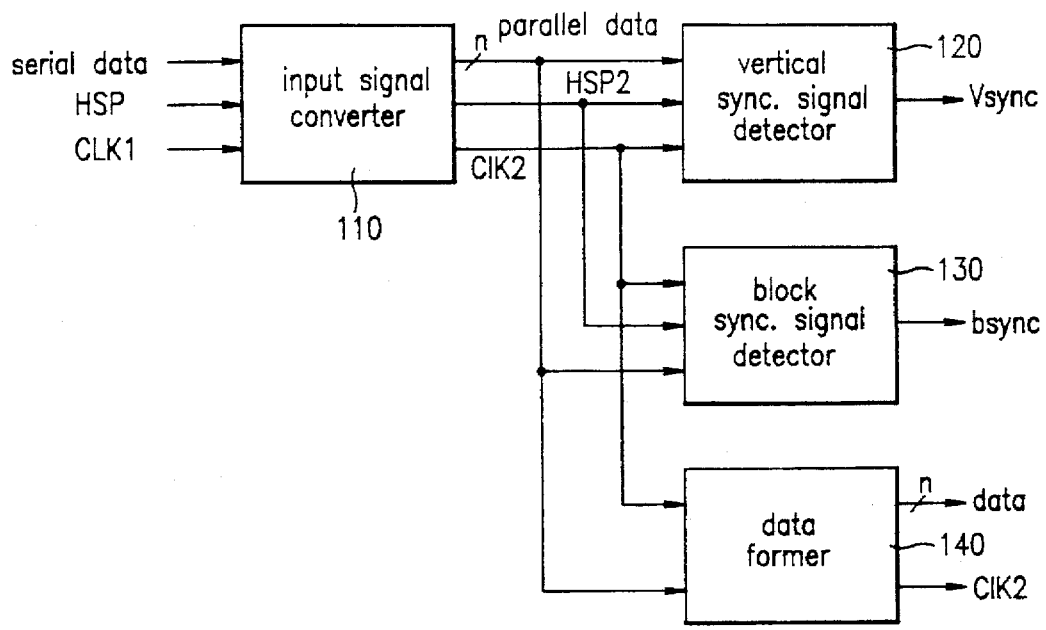
FIG. 8 is a block diagram of a synchronizing signal detector for DVCR according to the present invention.

FIG. 8 is a block diagram of a synchronizing signal detecting apparatus for DVCR according to the present invention. The apparatus includes an input signal converter 110 for converting input serial data, a first head switching pulse HSP1 and a first clock clk1 into parallel data, a second head switching pulse HSP2 and a second clock clk2, a vertical synchronizing signal detector 120 and a block synchronizing signal detector 130 for respectively detecting a vertical synchronizing signal Vsync and a block synchronizing signal bsync from said parallel data, second head switching pulse HSP2 and second clock clk2 output from said input signal converter 110, and data former 140 for outputting finally output data in accordance with synchronizing patterns using said parallel and second clock clk2.

Figure 14A:
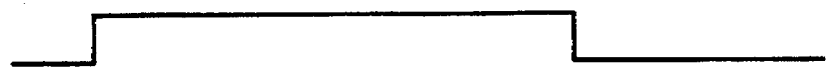
FIGS. 14A through 14F are timing charts of various signals shown in FIG. 9.
Figure 14B:

Input signal converter 110 generates parallel data, a second head switching pulse HSP2 and a second clock clk2 (FIG. 14B) using input serial data, a first head switching pulse HSP1 and a first clock clk1 (FIG. 14A), for detecting a vertical synchronizing signal Vsync for matching synchronization in the unit of 2 frames and a block synchronizing signal bsync for notifying an initiating point of start data in the unit of blocks. The second head switching pulse HSP2 floats at a rising or falling edge of the first head switching pulse HSP1 and is used as a reference signal of a window signal. The second clock clk2 which is a main clock of this system is a clock having a duty cycle ratio of 50 to 50, the cycle inverting every n/2 using the first clock clk1.

Figure 9:
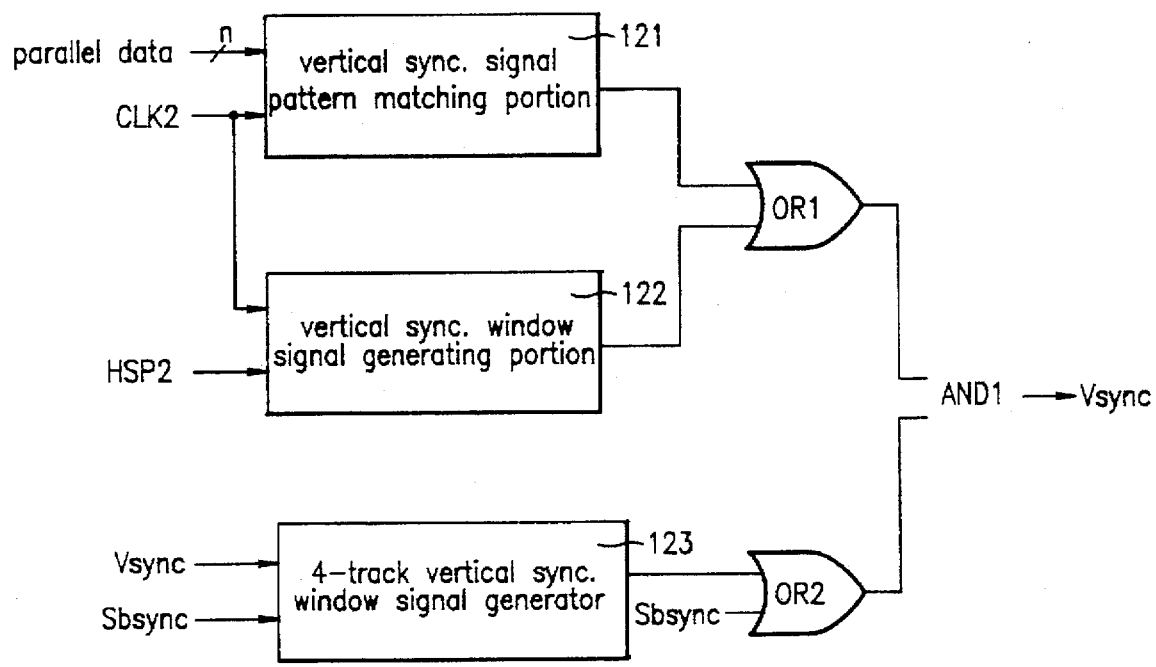
FIG. 9 is a detailed block diagram of a vertical synchronizing signal detector shown in FIG. 8.

As shown in FIG. 9, vertical synchronizing signal detector 120 includes a vertical synchronizing signal pattern matching portion 121 for matching a vertical synchronizing signal pattern using the parallel data and second clock clk1, a vertical synchronizing window signal generator 122 for generating a window pulse for notifying a position at which the vertical synchronizing signal floats using the second clock clk2 and second head switching pulse HSP2, a 4-track vertical synchronizing window signal generator 123 for generating a window pulse in the unit of 4 tracks using a vertical synchronizing signal Vsync and a start block synchronizing signal Sbsync, a first OR gate OR1 for performing an OR operation with respect to outputs of vertical synchronizing signal pattern matching portion 121 and vertical synchronizing window signal generator 122, a second OR gate OR2 for performing an OR operation with respect to an output of 4-track vertical synchronizing window signal generator 123 and the start block synchronizing signal Sbsync, and a first AND gate AND1 for performing an AND operation with respect to outputs of first and second OR gates OR1 and OR2 to generate a vertical synchronizing signal Vsync.

Vertical synchronizing signal pattern matching portion 121 compares a vertical synchronizing signal pattern with a predetermined vertical synchronizing signal pattern among input parallel data, and outputs a vertical synchronizing signal pattern matching signal if both patterns are the same.

Figure 14C:
Figure 14D:
Figure 14E:

Vertical synchronizing window signal generator 122 generates a vertical synchronizing window signal shown in FIG. 14D for a constant period of a track using the second clock clk2. After the original vertical synchronizing signal Vsync is searched, a window signal for search a vertical synchronizing signal Vsync for every tracks is floated using the second head switching pulse HSP2.

If the vertical synchronizing signal Vsync in a portion "a" shown in FIG. 14C is not searched, a start block synchronizing signal Sbsync is put to the output of 4-track vertical synchronizing window signal generator 123 instead of the vertical synchronizing signal Vsync.

Figure 14F:
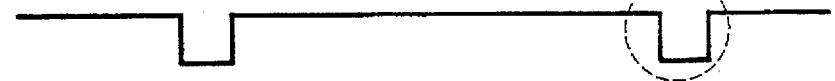

Then, first AND gate AND1 outputs the vertical synchronizing signal Vsync shown in FIG. 14F.

In other words, although a vertical synchronizing signal should have floated at the portion "a" of FIG. 14C, the signal does not float thereat. However, the vertical synchronizing signal normally floats at a portion "b" by a vertical synchronizing window signal shown in FIG. 14D and a start block synchronizing signal Sbsync shown in FIG. 14D. This means that it is regarded as if the vertical synchronizing signal Vsync is generated if the pattern matching signal of the vertical synchronizing signal or start block synchronizing signal Sbsync is generated in the vertical synchronizing window signal.

Figure 10:
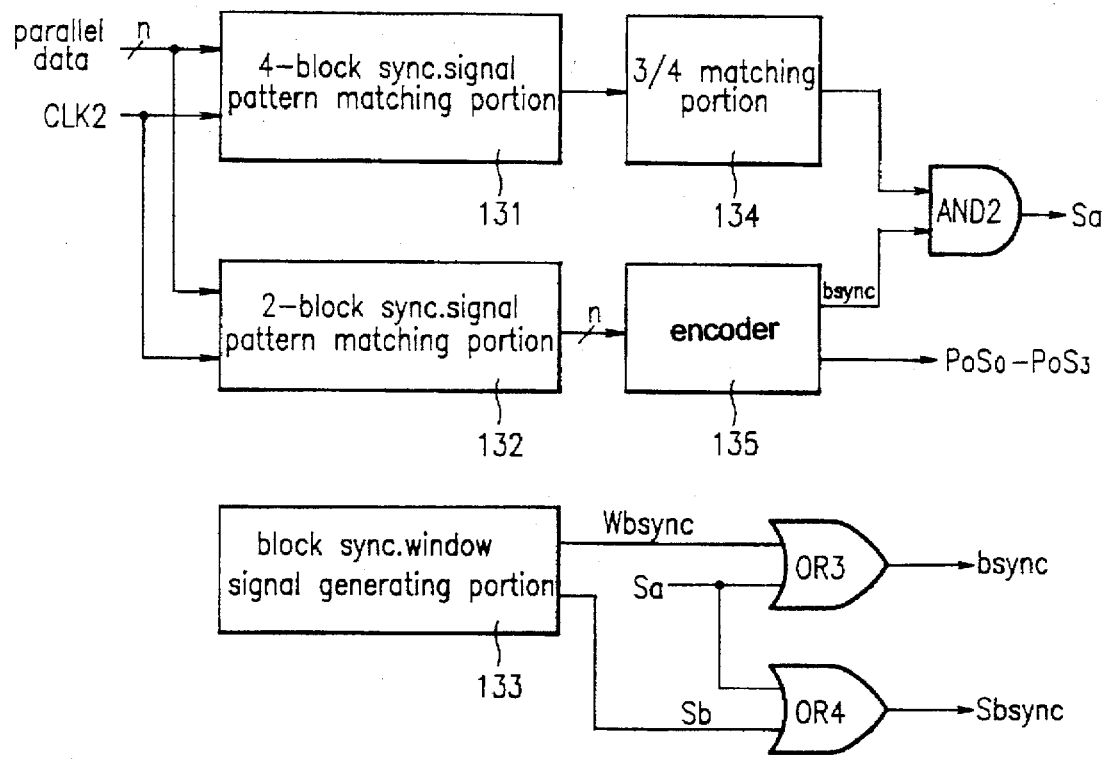
FIG. 10 is a detailed block diagram of a block synchronizing signal detector shown in FIG. 8.

As shown in FIG. 10, block synchronizing signal detector 130 includes a 4-block synchronizing signal pattern matching portion 131 and a 2-block synchronizing signal pattern matching portion 132 each for performing a pattern matching with respect to block syncs S0 through S3, and S3 and S4 of the block synchronizing signal bsync shown in FIG. 6 using the parallel data and second clock clk2 output from input signal converter 110, a block synchronizing window signal generator 133 for generating a block synchronizing window signal Wbsync which notifies the position at which the block synchronizing signal bsync floats, a ¾ matching portion 134 for performing at least three fourth the pattern matching of 4-block synchronizing signal pattern matching portion 131 for being regarded as the block synchronizing signal bsync, an encoder 135 for encoding the output of 2-block synchronizing signal pattern matching portion 132 to output synchronizing position signals pos0 through pos3, a second AND gate AND2 for performing an AND operation with respect to the outputs of ¾ matching portion 134 and encoder 135, a third OR gate OR3 for performing an OR operation with respect to the block synchronizing window signal Wbsync of block synchronizing window signal generator 133 and a block synchronizing pattern matching signal Sa of second AND gate AND2 to then output the block synchronizing signal bsync, and a fourth OR gate OR4 for performing an OR operation with respect to the start block synchronizing window signal Sb of block synchronizing window signal generator 133 and block synchronizing pattern matching signal Sa of second AND gate AND2 to then output the start block synchronizing signal Sbsync.

4-block synchronizing signal pattern matching portion 131 of block synchronizing signal detector 130 having the aforementioned configuration four sync byte synchronizing patterns of block syncs S0 through S3 shown in FIG. 6, respectively. In ¾ matching portion 134, it is regarded that block syncs are first detected, if it is checked that more than three sync byte synchronizing patterns are matched as the result of the matching.

2-block synchronizing signal pattern matching portion 132 matches synchronizing patterns of the block syncs S2 and S3 shown in FIG. 6 to then output the result to encoder 135. Encoder 135 outputs the block synchronizing signal bsync and synchronizing position signals pos0 through pos3.

Figure 15A:
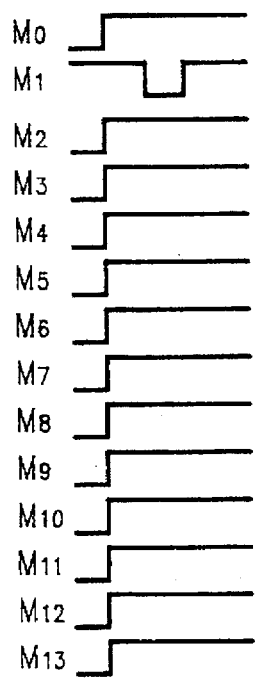
FIGS. 15A and 15B are output timing charts of a 2-block synchronizing signal pattern matching portion and an encoder shown in FIG. 10, respectively.
Figure 15B:
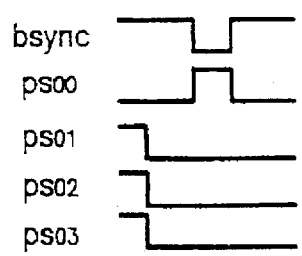

FIGS. 15A and 15B illustrate signals output from 2-block synchronizing signal pattern matching portion 132. For example, assuming that one sync byte is set to 14 bits, one sync byte is shifted by one bit to then be matched.

As the result, as shown in FIG. 15A, a synchronizing signal is detected in the second bit, encoder 135 generates the block synchronizing signal bsync and synchronizing position signals pos00 through pos04 as shown in FIG. 15B.

Figure 11:
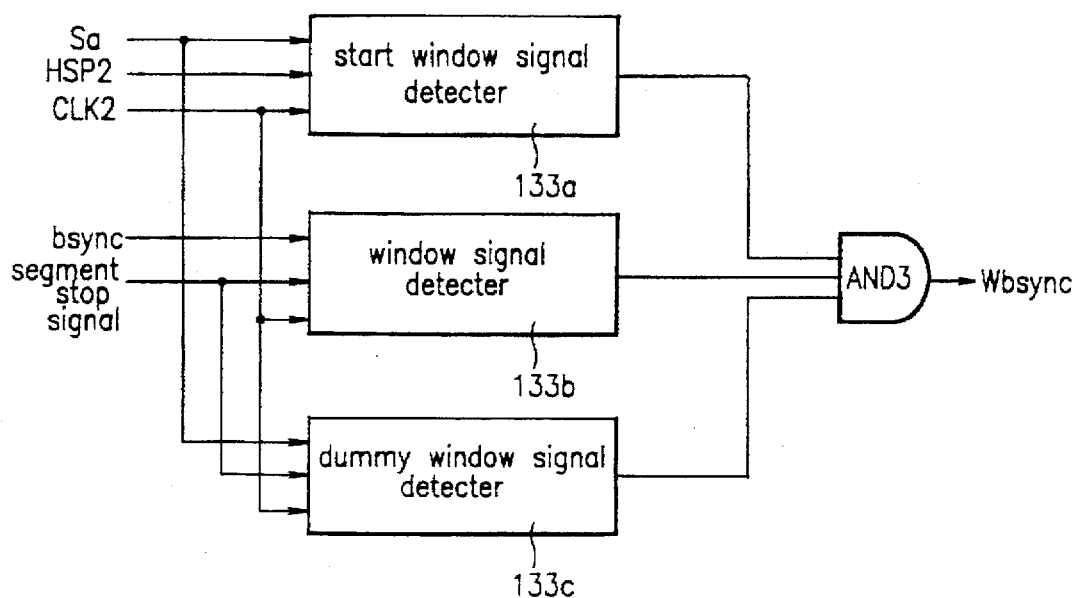
FIG. 11 is a detailed block diagram of a block synchronizing window signal generator shown in FIG. 10.
Figure 12:
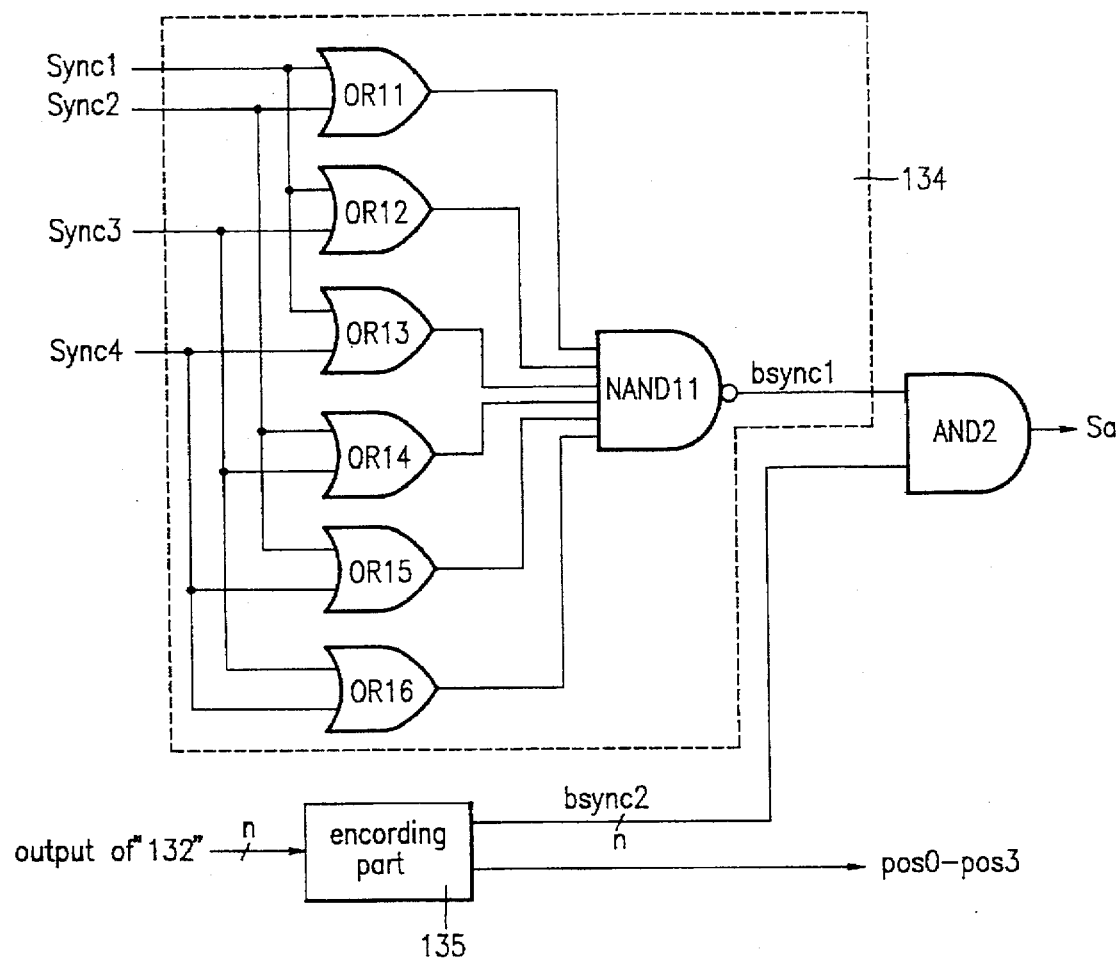
FIG. 12 is a detailed block diagram of a ¾ matching portion shown in FIG. 10.
Figure 13:
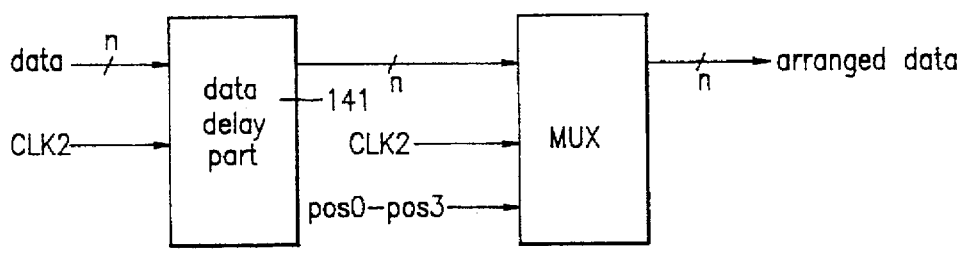
FIG. 13 is a detailed block diagram of a data former shown in FIG. 10.

As shown in FIG. 12, ¾ matching portion 134 includes eleventh through sixteenth OR gates OR11 through OR 16 and an eleventh NAND gate NAND11. Eleventh through sixteenth OR gates OR11 through OR 16 perform OR operations with respect to the pattern matching signals sync 1 through sync 4 for the respective block syncs S0 through S3 output from 4-block synchronizing signal pattern matching portion 131 with one another, and then eleventh NAND gate NAND11 outputs a ¾ matching signal bsync1. At this time, if more than three sync bytes are matched, a final block synchronizing pattern matching signals is obtained by second AND gate AND2, timing charts for which are shown in FIGS. 16A through 16G. Here, if three sync bytes are matched in NAND gate 11 or if encoder 135 outputs matched signals, both are regarded as the detected synchronizing signals and suitable synchronizing signals are searched thereafter as the window signal shown in FIG. 11.

Figure 16A:
FIGS. 16A through 16G are input versus output signal timing charts of a ¾ matching portion shown in FIG. 10.
Figure 16B:
Figure 16C:
Figure 16D:
Figure 16E:
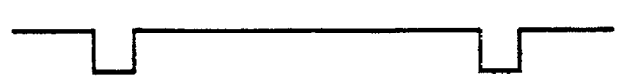
Figure 16F:
Figure 16G:

FIGS. 16A through 16D show the pattern matching signals sync1 through sync4, FIG. 16E shows the ¾ matching signal bsync1, FIG. 16F shows a block synchronizing signal bsync2, and FIG. 16G shows a block synchronizing pattern matching signal Sa output from second AND gate AND2.

The outputs of ¾ matching portion 134 encoder 135 are output as the block synchronizing pattern matching signal Sa via second AND gate AND2, which allows to be output as the final block synchronizing signal bsync. The operation of block synchronizing window signal generator 133 will now be described with reference to FIGS. 17A through 17G.

Figure 17A:
FIGS. 17A through 17G are input versus output signal timing charts of the block synchronizing window signal generator shown in FIG. 10.
Figure 17B:
Figure 17C:
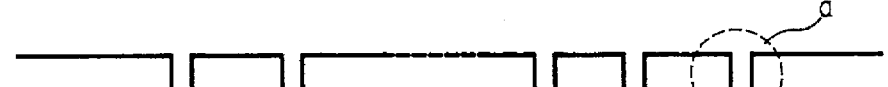
Figure 17D:

First, block synchronizing window signal generator 133 includes a start window signal detector 133a, a window signal detector 133b, a dummy window signal detector 133c and a third AND gate AND3. Start window signal detector 133a receives a block synchronizing pattern matching signal Sa output from second AND gate AND2, a second head switching pulse HSP2 and a second clock clk2, as shown in FIG. 17C, and detects the first block synchronizing signal bsync detected from a track on the basis of the second head switching pulse HSP2 as shown in FIG. 17A, i.e., a start window signal (FIG. 17D).

Figure 17E:

Window signal detector 133b receives a block synchronizing signal bsync, a segment stop signal (FIG. 17B) and a second clock clk2 and detects the block synchronizing signal bsync continuously detected from the first block synchronizing signal bsync (FIG. 17E).

Figure 17F:
Figure 17G:

Dummy window signal detector 133c receives the segment stop signal from ID. On the basis thereof, a window of a constant interval is opened to then detect the first block synchronizing signal bsync after dummy data on the AND gate AND3 block synchronizing signal bsync (FIG. 17F). The segment stop signal notifies that dummy data initiate.

The outputs of various parts 133a through 133c are AND-operated through a third AND gate AND3 and the result is output as a block synchronizing window signal Wbsync.

Also, the output of block synchronizing window signal generator 133 are input to third and fourth OR gates OR3 and OR4 with block synchronizing pattern matching signal Sa output from second AND gate AND2 to output the final block synchronizing bsync and the start synchronizing signal Sbsync result is input output 133.

FIGS. 17A through 17G illustrate if block synchronizing pattern matching signal Sa is generated inside a window signal, block synchronizing signal bsync is detected. If synchronizing pattern matching signal Sa is generated inside a window signal, block synchronizing signal bsync is detected. However, if the block synchronizing pattern matching signal Sa is generated outside a window signal, it is regarded as being erroneously detected. A block synchronizing pattern matching signal is not generated at a portion "a" of FIG. 17 but is generated inside the window signal. Thus the block synchronizing signal bsync is not floated like a portion "b" as shown FIG. 17G.

Data former 140 is delayed only for a signal processing period of vertical synchronizing signal detector 120 and block synchronizing signal detector 130 through data delay 141. Thereafter, data are finally output by synchronizing position signals pos0 through pos3 applied from encoder 135 by means of a multiplexer MUX via data delay 141.

Figure 18:
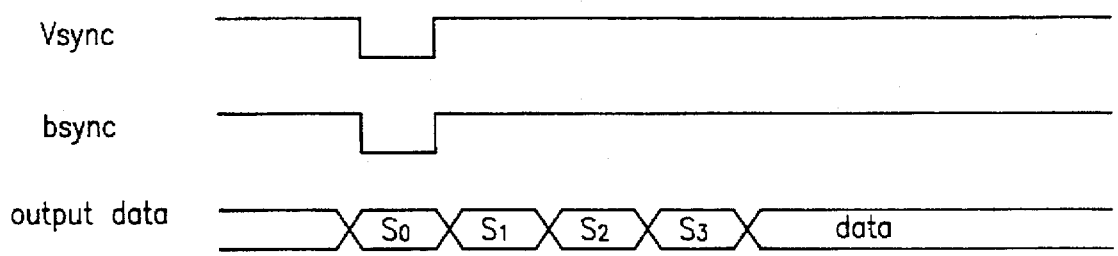
FIG. 18 shows data output timing charts according to the present invention.

FIG. 18 illustrates a final output signal data outputs due to the generation of a vertical synchronizing signal and a horizontal synchronizing signal.

As described above, according to the present invention, predefined synchronizing patterns are first regarded as being synchronous even if the predefined synchronizing patterns are not all matched but have an error of a few bits, a synchronizing signal is prevented from being erroneously detected from data by presetting a position where the synchronizing signal is to be generated, and a clock number difference between synchronizing patterns is removed by presetting a synchronizing signal matching position in a parallel processing method, thereby enabling to detect a synchronizing signal more precisely. Also, the acquisition of slipped data is facilitated by rearranging output data in the unit of sync blocks.

What is claimed is:

1. A synchronizing signal detecting apparatus for a digital video cassette recorder(DVCR) comprising:

an input signal converting means for converting input serial data, a first head switching pulse and a first clock into a parallel data, a second head switching pulse and a second clock;

a vertical synchronizing signal detecting means and block synchronizing signal detecting means for respectively detecting a vertical synchronizing signal and a block synchronizing signal from said parallel data, second head switching pulse and second clock output from said input signal converting means; and a data forming means for outputting finally output data in accordance with synchronizing patterns using said parallel data and second clock, wherein said vertical synchronizing signal detecting means further comprises:

a vertical synchronizing signal pattern matching portion for matching a vertical synchronizing signal pattern using the parallel data and second clock;

a vertical synchronizing window signal generating means for generating a window pulse for notifying a position at which the vertical synchronizing signal is a floating signal using the second clock and second head switching pulse;

an N-track vertical synchronizing window signal generating means for generating a window pulse in the unit of 4 tracks using a vertical synchronizing signal and a start block synchronizing signal;

a first OR gate for performing an OR operation with respect to outputs of said vertical synchronizing signal pattern matching portion and said vertical synchronizing window signal generating means;

a second OR gate for performing an OR operation with respect to an output of said N-track vertical synchronizing window signal generating means and said start block synchronizing signal; and an AND gate for performing an AND operation with respect to outputs of said first and second OR gates to generate a vertical synchronizing signal.

2. The synchronizing signal detecting apparatus as claimed in claim 1, wherein said block synchronizing signal detector comprises:

a 4-block synchronizing signal pattern matching portion each for performing a pattern matching with respect to first through fourth block syncs of said block synchronizing signal using said parallel data and second clock output from said input signal converting means;

a 2-block synchronizing signal pattern matching portion for performing a pattern matching with respect to third and fourth block syncs of said block synchronizing signal using said parallel data and second clock output from said input signal converting means;

a block synchronizing window signal generating means for generating a block synchronizing window signal which notifies the position at which said block synchronizing signal floats;

a ¾ matching portion for performing at least three fourth said pattern matching of said 4-block synchronizing signal pattern matching portion for being regarded as the block synchronizing signal;

an encoding means for encoding the output of said 2-block synchronizing signal pattern matching portion to output synchronizing position signals;

a third OR gate for performing an OR operation with respect to said block synchronizing window signal of said block synchronizing window signal generating means and a block synchronizing pattern matching signal of said AND gate to then output said block synchronizing signal;

a fourth OR gate for performing an OR operation with respect to the start block synchronizing window signal of said block synchronizing window signal generating means and block synchronizing pattern matching signal of said AND gate to then output a start block synchronizing signal; and an AND gate for performing an AND operation with respect to the outputs of said ¾ matching portion and encoding means.

3. The synchronizing signal detecting apparatus as claimed in claim 2, wherein said block synchronizing window signal generating means comprises:

a start window signal detecting means for detecting the first block synchronizing signal detected from a track using a block synchronizing pattern matching signal, a second head switching pulse and a second clock on the basis of said second head switching pulse;

a window signal detecting means for detecting block synchronizing signal consecutively detected from said first block synchronizing signal using a block synchronizing signal, a segment stop signal and a second clock;

a dummy window signal detecting means for detecting the first block synchronizing signal following after dummy data using said block synchronizing pattern matching signal, segment stop signal and second clock; and an AND gate for performing an AND operation with respect to the outputs of said respective parts to then output a block synchronizing window signal.

4. The synchronizing signal detecting apparatus as claimed in claim 2, wherein said ¾ matching portion comprises:

a plurality of OR gates for performing OR operations with respect to first through fourth pattern matching signals for first through fourth block synchronizing signals from said 4-block synchronizing signal pattern matching portion; and a NAND gate for performing NAND operations with respect to the output of said plurality of OR gates to output a ¾ matching signal.

5. The synchronizing signal detecting apparatus as claimed in claim 1, wherein said data forming means comprises:

a data delay for temporarily storing output data of said input signal converting means during processing time of said vertical synchronizing signal detecting means and block synchronizing signal detecting means using said second clock output from said input signal converting means; and a multiplexer for outputting data from said data delay in accordance with synchronizing position signals output from an encoding means.

* * * * *